(12) United States Patent (10) Patent No.: US 8,573,049 B1
Ware (45) Date of Patent: Nov. 5, 2013

(54) RAIN GAUGE AND IRRIGATION SYSTEM

(75) Inventor: John Antony Ware, Llanelli (GB)

(73) Assignee: Underhill International Corporation, Lake Forest, CA (US)

(*) Notice: Subject to any disclaimer, the term of this patent is extended or adjusted under 35 U.S.C. 154(b) by 833 days.

(21) Appl. No.: 12/614,076

(22) Filed: Nov. 6, 2009

(51) Int. Cl.
*G01W 1/00* (2006.01)

(52) U.S. Cl.
USPC ............................................. 73/170.17

(58) Field of Classification Search
USPC .............. 73/170.17, 170.12, 170.21; 700/284
See application file for complete search history.

(56) References Cited

U.S. PATENT DOCUMENTS

| | | | | |
|---|---|---|---|---|
| 4,520,667 | A * | 6/1985 | Nelson | 73/170.21 |
| 4,827,766 | A * | 5/1989 | Nelson | 73/170.21 |
| 4,921,001 | A * | 5/1990 | Pittsinger | 137/78.2 |
| 5,125,268 | A * | 6/1992 | Caron | 73/170.17 |
| 5,505,082 | A * | 4/1996 | Cushman et al. | 73/170.21 |
| RE35,762 | E * | 4/1998 | Zimmerman | 250/574 |
| 5,870,302 | A * | 2/1999 | Oliver | 700/11 |
| 6,453,216 | B1 * | 9/2002 | McCabe et al. | 700/284 |
| 6,640,649 | B1 * | 11/2003 | Paz et al. | 73/861.41 |
| 7,058,479 | B2 * | 6/2006 | Miller | 700/284 |
| 7,552,632 | B2 * | 6/2009 | Runge et al. | 73/170.17 |
| 7,596,429 | B2 * | 9/2009 | Cardinal et al. | 700/284 |
| 7,899,580 | B2 * | 3/2011 | Cardinal et al. | 700/284 |
| 7,966,153 | B2 * | 6/2011 | Bangalore | 702/188 |
| 2004/0140903 | A1 * | 7/2004 | Buhler | 340/602 |

* cited by examiner

*Primary Examiner* — Lisa Caputo
*Assistant Examiner* — Octavia Davis-Hollington
(74) *Attorney, Agent, or Firm* — Novak Druce Connolly Bove + Quigg LLP (57) ABSTRACT

A rain gauge includes an orifice which is of a diameter generating water drops of uniform mass. A sensor below the orifice senses individual water drops. An adapter for an irrigation controller having a master valve output and a rain switch input and a system therefor includes a rain gauge input, a weather station input receiving Evapotranspiration data (ET) and an input from the master valve output receiving irrigation program cycles. A routine for updating the current water balance value by reducing the sum of the rainfall and the irrigation cycles by the value of ET is used with an output to the rain switch input responsive to the determination of the current water balance value. A maximum water balance value and a minimum water balance value are maintained to compare with the current water balance value to control the irrigation program.

10 Claims, 5 Drawing Sheets

RAIN GAUGE AND IRRIGATION SYSTEM

BACKGROUND OF THE INVENTION

The field of the present invention is rain gauges and irrigation systems associated therewith.

Conventional irrigation controllers apply water in a pre-entered series of scheduled watering programs. A watering program or cycle is defined as a plurality of stations also called zones, each given a sequential active duration in minutes. When active, its electric solenoid valve is opened, so allowing water to its zone. The program is then given a schedule of what time of day to start its sequence and which days to water.

There frequently is an input on the controller for a switch in a sensor that is opened when a certain amount of rainfall has fallen. The opening of the rain sensor's switch pauses or cancels any running or pending watering program, so saving irrigation water when rainfall will suffice instead. There also frequently is a master valve output that is energized at the beginning of a watering program and de-energized at the end. The purpose of this output is to start an irrigation pump, or to open a common valve that supplies the network of irrigation water pipes to the individual zone solenoid valves.

The quantitative measurement of rainfall is useful in irrigation to judge how much additional water need be applied to keep a crop, golf course field or garden healthy. Various methods have been used.

The most common is a series of expanding disks that swell as they become wetted, eventually operating a micro switch. This inhibits watering by the controller until the disks dry out. Mechanical adjustments to the sensor are provided both to alter the threshold of swelling that operates the micro switch and to control the length of time it takes for the disks to dry out and shrink, so allowing watering to recommence.

Another common method is the tipping bucket. Two small buckets on a see saw, one at each end, are so positioned under the open bottom end of a collecting vessel. The higher bucket collects the rain until it tips, discarding its contents and positioning the empty bucket to collect further rain. The action of tipping activates a momentary switch, signalling that a bucket's worth of rain has been collected. The process is repeated with the other bucket and the cumulative switch closures represent the total rainfall collected. A controller can then compute the rainfall and adjust its watering durations accordingly. The assembly must be carefully adjusted to be horizontal else the amount of water in the buckets will be different before they tip.

The rain gauges employed may directly actuate the rain sensor switch of an irrigation controller. Alternatively, an adapter may be used to control the input to the rain sensor switch of an irrigation controller. Various levels of sophistication as to the quantity of water sensed, the frequency of measurement and the impact on the watering program have been provided.

SUMMARY OF THE INVENTION

The present invention is directed to a rain gauge having a collecting vessel including an open top, an upwardly concave bottom and a peripheral sidewall.

The bottom has an orifice draining the collecting vessel and being of a diameter generating water drops of uniform mass. A sensor below the orifice senses the individual water drops. An irrigation system is contemplated to employ this rain gauge. Accurate, immediate and continuous rainfall monitoring can be achieved.

In an additional aspect of the present invention, the rain gauge may have a deflector with an upwardly facing inclined surface and an outer periphery between and displaced from both the open top and the upwardly concave bottom. A passage through the deflector at the peripheral sidewall directs rainwater to flow down the sidewall of the collecting vessel toward the orifice. This aids in conditioning the flow of water to the orifice to keep the flow from impacting the flow from the orifice.

In a further aspect of the present invention, the rain gauge can employ a filter in a filter cavity of the collecting vessel directly above the orifice. The filter may be hydrophilic and both fill the filter cavity and extend upwardly from the filter cavity to filter foreign matter and wick rainwater toward the orifice.

In another aspect of the present invention, the sensor of the rain gauge may include a flexible membrane having a piezo-electric film cantilevered into the path of the water drops to sense each drop impacting the film. A comparator and counter can then condition the voltage signals from the piezo-electric film and digitally count to determine quantity of rainfall. Other sensing devices can alternatively be used.

In another aspect of the present invention, an adapter for an irrigation controller having a master valve output and a rain switch input includes a rain gauge input indicative of rainfall amounts, a weather station input receiving Evapotranspiration data (ET) and an input from the master valve output receiving irrigation program cycles.

A routine for updating the current water balance value by reducing the sum of the rainfall and the irrigation cycles by the value of ET is used with an output to the rain switch input responsive to the determination of the current water balance value.

In a further aspect of the present invention, a system for adapting an irrigation controller having a master valve output and a rain switch input to meet current watering needs includes maintaining a current water balance value indicative of the current watering needs. To this end, ET is received from a weather station, irrigation program cycle data is received from the master valve output and rainfall data is received from a rain gauge. The current water balance value is then determined by reducing the sum of the rainfall and the irrigation by the value of ET. A maximum water balance value and a minimum water balance value are maintained with a comparison of these values with the current water balance value to shut off the irrigation program when the maximum water balance value is reached and to turn on the irrigation program when the minimum water balance value is reached.

Further, any of the foregoing aspects can be combined to greater advantage.

Therefore, it is a principle object of the present invention is to provide an improved rain gauge and irrigation system. Other and further objects and advantages will appear hereinafter.

DETAILED DESCRIPTION OF THE PREFERRED EMBODIMENTS

Turning first to an outline of the operation of a preferred embodiment, a rain gauge includes an open topped collecting vessel having an orifice located in an upwardly concave truncated conical bottom of the collecting vessel. The mass of a drop formed at the end of an orifice is dependent upon the surface tension of the liquid and the circumference of the orifice, a phenomenon long exploited in the delivery of fluids by intravenous drip. In irrigation, variations in the surface tension of rainwater do not affect the mass of drops formed at the orifice beyond acceptable limits. Additionally, to ensure consistency and accuracy, the orifice is advantageously made of stainless steel to close dimensional tolerance. It is also of a diameter to ensure that a reasonably high number of drips represents practical rainfall quantities and that the drip rate stays within a range that can be practically counted. Such an orifice size meeting these criteria is 0.6 mm, with a tube length of approximately 6 mm. This assembly is readily available from several manufacturers, being used as the dispensing tip for solder pastes during the manufacture or repair of surface mounted electronic components. It is accepted that the orifice may be constructed by other methods. These may include moulding it into the collecting vessel, or the inclusion of a stainless steel plate having a chemically etched orifice of accurate circumference.

A deflector defined by an upwardly convex conical plate is mounted below and displaced from the open top. This plate directs all rainfall to the peripheral sidewall of the vessel and an annular passage through the plate. In this embodiment, the annular passage is substantially fully about the outer periphery of the plate with breaks to support the plate in the collecting vessel. The water flows along the inner periphery of the vessel to the bottom. This slows the raindrops to prevent the momentum of the falling rain from transferring energy into any pool of water at the bottom of the collecting vessel. Such a disturbance would distort the size of the drip from the orifice below, dislodging it before it has reached that critical mass initiating detachment. It is accepted that a variety of shapes and paths may be employed, but all will discourage the loss of rain caused by splashing back out from the collecting vessel and at the same time slow the raindrops so that they gently arrive at the bottom of the vessel and avoids prematurely dislodging drips from the orifice.

A close-weave filter is at the bottom of the collecting vessel to prevent dust and insects from clogging the orifice below. The filter may advantageously be designed so that its pore size is smaller than the orifice diameter. The filter is of a volume that does not significantly retain trapped rainfall. This plug in a collecting vessel of 35 mm diameter results in retention of less than 1% of the amount of water collected by one eighth of an inch of rain. In the present embodiment the filter is made of hydrophilic porous polyethylene foam, in the form of a cylindrical plug. This is inserted into a filter cavity directly above the orifice at the upwardly concave bottom of the collecting vessel to fill the cavity and extend upwardly there from, acting as both a filter and a wick. This latter property prevents air bubbles from forming in the mouth of the orifice and impeding the water flow.

It is accepted that the filter may eventually clog, however initially; partial clogging will merely slow down the passage of rainwater through the orifice without materially altering the total amount. The process of rain falling and irrigation cycles last many hours, so this slowing down will not appreciably affect the outcome of calculation of water to be applied by the irrigation system. In the present embodiment, the filter is advantageously removable and may be replaced. It is also an advantage to be able to remove the whole collecting vessel assembly, including the orifice, which itself is fixed to the collecting vessel but detachable for either cleaning or replacement.

A sensor housing is defined below the orifice in a passageway for the drips exiting there from. In the first embodiment, the drips are counted by each impinging on a sensor located in the passageway in the sensor housing. The sensor is defined by the end of a cantilever-mounted waterproof flexible membrane containing a piezo-electric film. The momentum of the impinging drip deflects the film, producing a transient voltage that is conditioned electronically into a useable digital pulse that can be counted. The film is angled so the impacting drip rolls off the end ready for the next drip. Because each drip is of a constant mass, the analogue of momentum need not be measured, merely the presence or absence of a droplet impinging on the film, an essentially digital phenomenon. To achieve sufficient momentum, the tip of the film in this embodiment is mounted no less than 50 mm below the tip of the orifice. At this distance of fall, the piezo-electric sheet is deflected sufficiently on impact to produce some 1 volt peak to peak output. This may be detected by a high impedance comparator integrated circuit outputting a logic level which may be counted. The output of the membrane is a damped oscillation, so the resulting train of pulses from the comparator from one impact must be debounced, a standard practice for many pulse counting applications involving contact closures.

It is accepted that other methods might be used to count the drips. For example, passing the falling drip though a light beam which is then interrupted, so producing a signal at an optical receiver such as a photo-electric cell. Another method might use the passing of the drip between two plates of a charge plate capacitor having a potential difference between them. The permittivity of water is some 80 times greater than air, so as the drip passes the plates, the capacitance increases, making an electric charge flow that can be measured by an electrometer amplifier. This transient change in amplifier output can be further conditioned to produce a digital pulse that can then be counted by the controller.

The water draining from the tip of the piezo-electric film or through another sensing device, vents through holes in the bottom of the sensor housing. This advantageously is covered by a close weave mesh to prevent infestation and colonisation by insects.

In the first embodiment, the collecting vessel may be mounted some way off the vertical, the limiting angle being that the drip from the orifice impinges on the wrong part of the piezo-electric film or misses it entirely. Other sensing systems may demand more critical vertical alignment.

In any embodiment so described, the output is digital; each conditioned pulse representing an assumed constant mass of water. As the surface tension of water is relatively constant over the practical range of temperatures of rainfall, and rain itself is relatively free of pollutants which might alter its surface tension, a constant may be derived dependent on the above, a known orifice size and the collecting area of the vessel. In the present embodiment, one half inch of rain results in 530 drips. Were the rain to happen over a very short time, the collected rainfall would be fully converted to drips over approximately 4 minutes, thus the onset of rainfall results in drips almost immediately.

To utilize the resulting digital voltage pulses, a counter, which may be either software or an electronic circuit, accumulates the total number of conditioned pulses. The number of pulses multiplied by the constant defined by the average drip size from the orifice will equal the amount of rainfall. This software or hardware could be incorporated within the irrigation controller which must be so adapted. However it is accepted that a separate electronics or microprocessor and software assembly may be employed exterior to the controller. This assembly may contain a user adjustable threshold for accumulated rainfall, which when exceeded, alters the state of a relay, the contacts of which may be connected to a controller equipped with a rain sensor input. With such an assembly, an existing controller may utilize the computations of the present embodiment without itself needing any additional software or hardware.

Figures 1, 2:
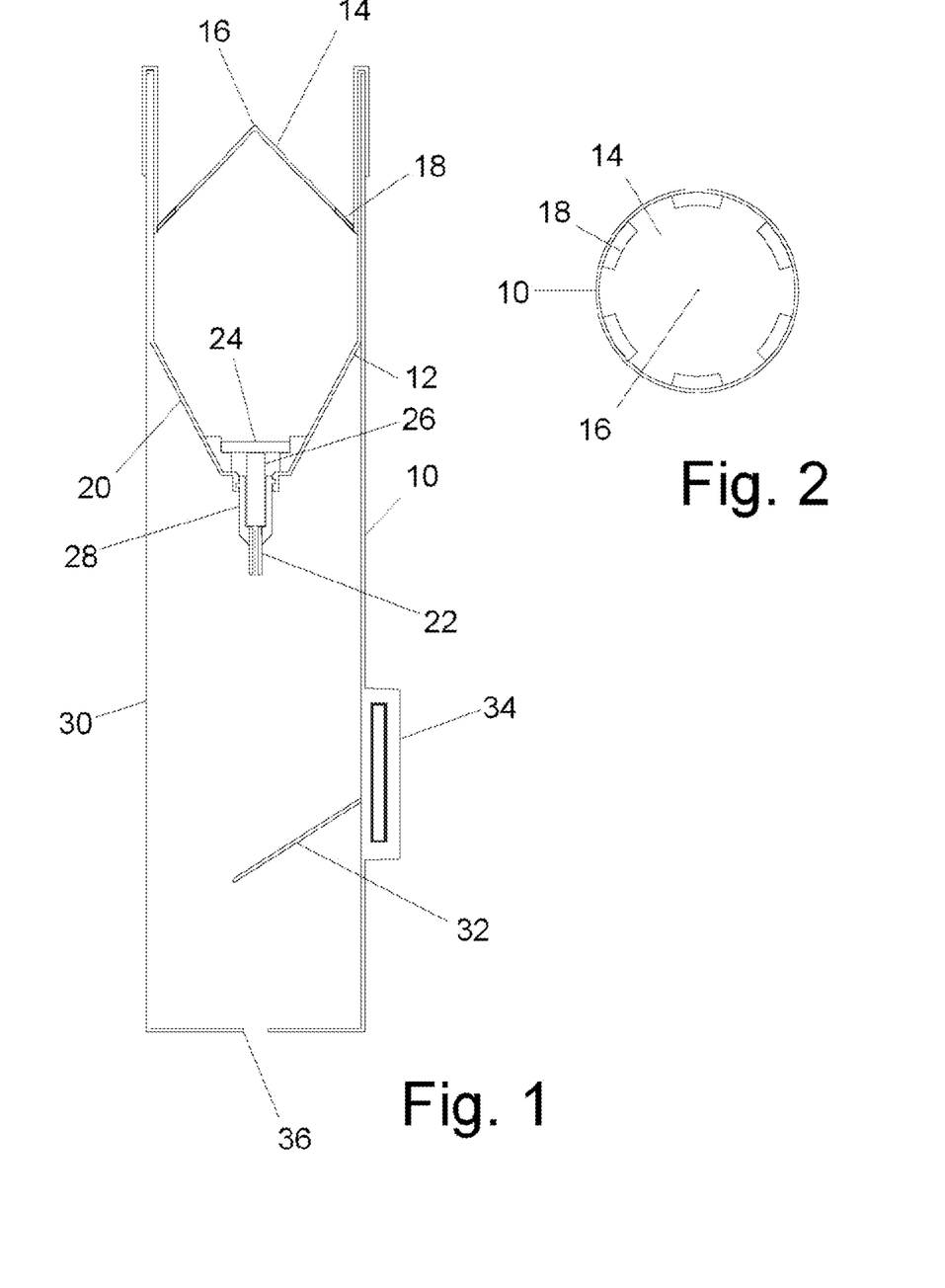
FIG. 1 is a cross-sectional schematic elevation of a rain gauge.
FIG. 2 is a plan view of the rain gauge of FIG. 1.

Reference is now made to FIG. 1 wherein there is shown a cross section of the first embodiment of a rain collector and drip detector using a piezo-electric film.

A Reference is now made to FIG. 1 wherein there is shown a cross section of the first embodiment of a rain collector and drip detector using a piezo-electric method.

An orifice assembly is attached to the upwardly concave, truncated conical bottom 20 of the collecting vessel 12. The orifice assembly has an orifice 22 of accurate internal circumference. In this first embodiment the orifice 22 is a dispensing tip such as may be used to dispense solder pastes. Water collecting in the bottom 20 passes though a perforated plate 24 and a filter 26 before passing down the stainless steel hollow needle of the orifice 22.

At the end of the needle 22, the water forms a drip, which grows until it can no longer be suspended and falls off. At the point of detachment, the mass of the drip is determined by the surface tension of the water and the circumference of the needle's internal diameter according to the formula $$m = \pi \cdot d \cdot \gamma / g$$

Where:
m=mass of the drip in Kg
d=internal diameter of the needle in meters
γ=surface tension of water in Newtons/meter
g=acceleration of gravity, 9.8 meters per second$^2$
π=pi, 3.1412

The surface tension of water varies with temperature, but only slightly, for example, from 71.97 mN/meter at +25° C. to 67.91 mN/meter at +50° C. Thus over the practical range of temperatures of falling rain, this variation may be approximated by an average figure.

In this first embodiment, the dispensing tip of the orifice 22 has an internal diameter of 0.6 mm and is 6 mm long. This is a compromise between drip size and frequency of drip formation. With this size of orifice and a collecting vessel diameter of 35 mm, ½ inch of rainfall translates into 530 drips at a maximum rate of 5 per second, which may be easily counted.

The orifice assembly includes a body 28 retaining the orifice 22 and defining a filter cavity to retain the filter 26. The filter 26 is above the orifice 22 in the filter cavity. It fills the filter cavity and extends from the filter cavity into the bottom of the collecting vessel 12 beneath the perforated plate 24. In this first embodiment the filter is made of a hydrophilic porous polyethylene of pore size 160 microns in the form of a cylinder to snugly fit inside the space between the start of the metal tip of the needle 22 and upwards into the base of the collecting vessel 12. The filter 26 performs two functions. Firstly it traps insects and dust that accumulate in the bottom of the collecting vessel preventing them from clogging the hollow needle. Secondly it forms a wick, transporting water collected in the bottom of the collecting vessel 20 directly to the start of the hollow needle 22. Without this wicking action under certain circumstances, an air lock can form just above the upper end of the hollow needle 22, preventing the flow of water until a considerable head has built up in collecting vessel 12. This would delay the onset of formation of drips removing the timely registration of the commencement of rainfall.

For maintenance and cleaning purposes it is advantageous to disassemble the components. Thus, in this first embodiment the deflector 16 may be removed from the collecting vessel 12 and, in turn, the collecting vessel 12 removed from the main body 10. The orifice assembly may be unscrewed from the bottom of the collecting vessel 12 and the filter 26 can be pulled from the opening at the bottom of the collecting vessel 12. Upon reassembly of the filter 26 into the opening of the bottom of the collecting vessel 12, it is advantageous not to create an air space just above the upper end of the orifice 22. The perforated plate 24 provides a stop to prevent this from happening, which together with the correct length of the filter 26 ensures that when the orifice body 28 is screwed back into the base of the collecting vessel 12, there is no air space just above the upper end of the orifice 22.

Drips forming at the end of the orifice will grow until they detach and fall along a pathway through the sensor housing 30. The drips accelerate under the influence of gravity, gaining momentum and kinetic energy. In this first embodiment, there is a thin piezo-electric plate 32 supported as a cantilever to the sensor housing 30. The plate 32 is insulated and made waterproof by lamination of Mylar front and back. The falling drips strike toward the end of the plate 32, thereby deflecting it. The deflection is of a sufficient magnitude to induce a usable voltage difference between the front and back of the plate 32. This voltage transient is passed through contacts on the plate 32 to a printed circuit board assembly 34, where, using conventional electronics, it is converted into a logic level pulse. The plate 32 has an overall thickness of 205 μm and a width of 13 mm. The cantilever length is 25 mm when mounted at an angle of 30 degrees from the horizontal. With the drip impact point on the plate 32 being 50 mm below the tip of the outlet of the orifice 22, a transient voltage of approximately 1 volt peak to peak is generated with each drip. The angle of mounting is determined to ensure that each drip impinging on the plate 32 runs off before the next hits.

Because each drip is of a constant mass, the analogue of momentum need not be measured, merely the presence or absence of a drip impinging on the plate 32, an essentially digital phenomenon. The electronics contained on PCB assembly 34 need only comprise a high input impedance differential comparator biased to change state when a voltage of greater than 0.2V appears across its terminals. The transient voltage developed by the piezoelectric plate 32 is of a damped sinusoid, thus the output of the comparator will consist of several level changes as a result of one impinging drip. These level changes may then be fed into a re-triggerable monostable to make just one pulse. This is known as debouncing, a conventional method used in mechanical contact sensing.

Once free of the plate 32, the drips may be disposed of through the bottom of the tube 10 through one or more of holes 36.

Figure 3:
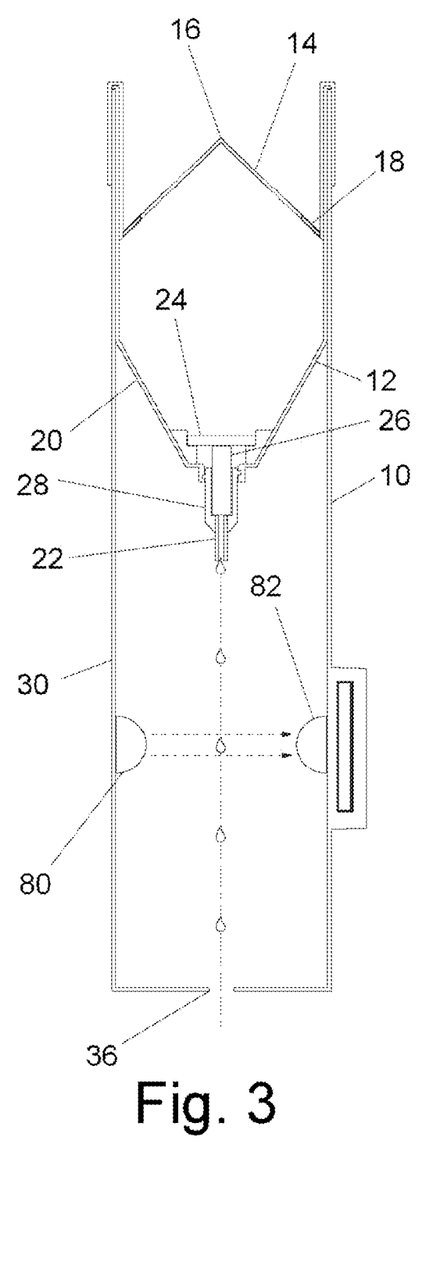
FIG. 3 is a view as in FIG. 1 of a second embodiment of the rain gauge.
Figure 4:
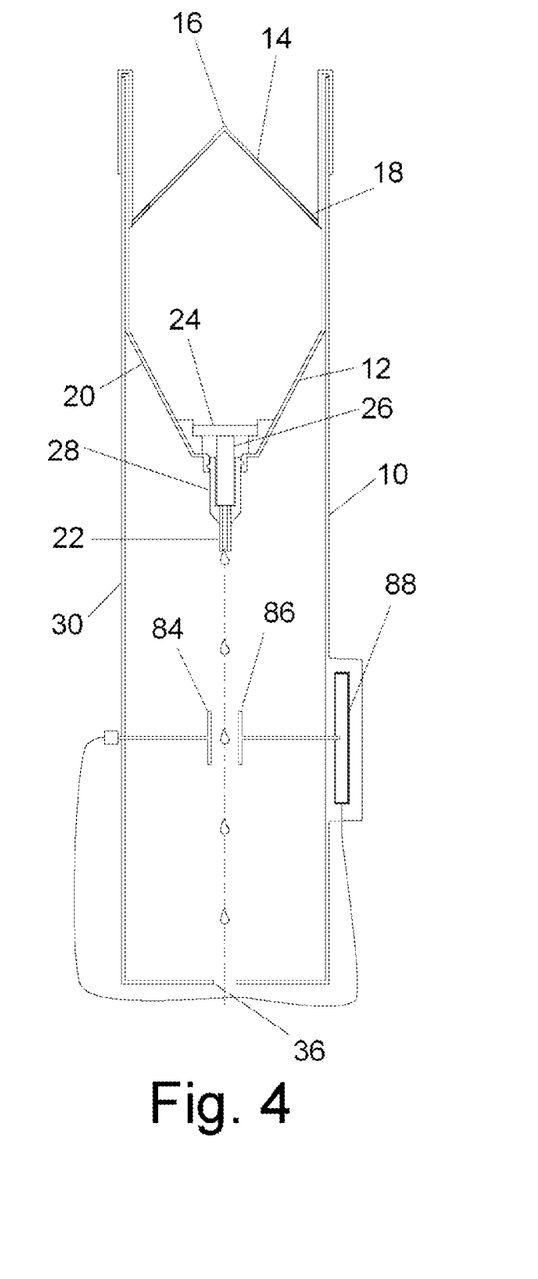
FIG. 4 is a view as in FIG. 1 of a third embodiment of the rain gauge.

Other methods than the cantilevered piezoelectric plate 32 might be used to count the conditioned drips. In a second embodiment illustrated in FIG. 3, the falling drips are passed through a light beam. The interruption of the light beam 80 by each drip produces a signal at an optical receiver such as a photo-electric cell 82. This signal can be further conditioned to produce a digital pulse that can then be counted by a counter associated with an irrigation controller. In a third embodiment illustrated in FIG. 4, the falling drips are passed between two plates 84, 86 of a charged plate capacitor having a potential difference between them. The permittivity of water is some 80 times greater than air, so as the drip passes the plates 84, 86, the capacitance increases, making an electric charge flow that can be measured by an electrometer amplifier 88. This transient change in amplifier output can be further conditioned to produce a digital pulse that can then be counted by a counter associated with an irrigation controller.

The rain gauge may provide input to an irrigation controller specially adapted to receive the sensor input. In the preferred embodiment, an adapter external to the controller is used which does not require restructuring of the controller. The adapter consists of an electronic circuit in a small housing that is connected to a weather station and to the rain gauge, and wired to both the master valve output and the rain switch input of the controller. Using rainfall measured by the rain gauge and Evapotranspiration data from the weather station, the adapter uses the controller's rain switch input to allow or disallow the controller's pre-entered watering programs to run, so replenishing the water deficit caused by Evapotranspiration.

In operation, a figure for the amount of replenishment made by a cycle of the controller's watering program is manually entered into the adapter. By sensing the activation and then deactivation of the master valve output by the controller, the adapter can deduce that the watering program has run, and can add the replenishment figure to its measured deficit to then decide whether to let further irrigation programs be allowed or disallowed.

The maximum water depletion below which watering may be commenced and the maximum replenishment above which further watering will be disallowed are also entered as constants to the adapter. Using these two thresholds, together with the weather station's measured Evapotranspiration, the rain gauge input and the replenishment amount furnished by the controller's watering program, the adapter will constrain the controller to ensure that the irrigation amount will oscillate hysterically between these two thresholds.

Reference is made herein to the term Water Balance. Water Balance is generally understood to be the algebraic sum of the aggregate of the amount previously irrigated plus the rainfall received, less the cumulative Evapotranspiration loss added to the existing Water Balance.

$$WB_f = WB_s + Rain + Irrigation - ET$$

Where:
$WB_f$ is the final net Water Balance in inches/mm.
$WB_s$ is the starting net Water Balance in inches/mm.
Rain is the usable rainfall over the period in inches/mm.
Irrigation is the water applied over the period in inches/mm.
ET is the Evapotranspiration for the crop over the period in inches/mm.

To first explain the procedure for use of an adapter as a series of discrete steps applied to the controller and the adapter:

The controller is programmed to have multiple starts per day of its watering program.
In the program, the watering time on each zone is reduced proportionally so that the worst case expected daily water needs for that geographic region will be the sum of all the day's watering programs added together.
To accommodate variations in the water needs of various plants, Cool Season Turfgrass water needs may be advantageously chosen as the benchmark, or if not present, the plant type that requires the most amount of water in the site to be irrigated. The variation in minutes already set up in each of the controller's zones to accommodate different plant types will track this benchmark, so all will water correctly.
The adapter is then programmed with the amount in inches/mm that each cycle of the watering program currently adds for Cool Season Turfgrass, or if not present, the plant type that requires the most amount of water in the site to be irrigated.
The controller's master valve output is tapped so the adapter can detect that an irrigation watering program has taken place.
The controller is configured to ensure the master valve remains on during the whole of each watering program.
At the end of each instance of the watering program, the inches/mm of water applied by the cycle for the chosen benchmark is added to the algebraic sum held in the adapter of ET, less irrigation applied and rainfall to derive the change in Water Balance, which is then added to the starting Water Balance to derive the final Water Balance.
In the adapter, an upper threshold for the final Water Balance is set, beyond which the adapter will inhibit irrigation.
In the adapter, a lower threshold for the final Water Balance is set, below which the adapter will allow irrigation.
The adapter's control output is coupled with the rain switch input of the controller.
From then on, the adapter will allow or disallow watering program starts using the rain switch inhibit, depending on the final Water Balance it deduces from the sum of previous allowed irrigation watering programs, the estimate of ET and measured rainfall from the weather station added to the starting Water Balance. This balance will cycle hysteresically between the upper and lower limits that have been programmed into the adapter.

Figure 5:
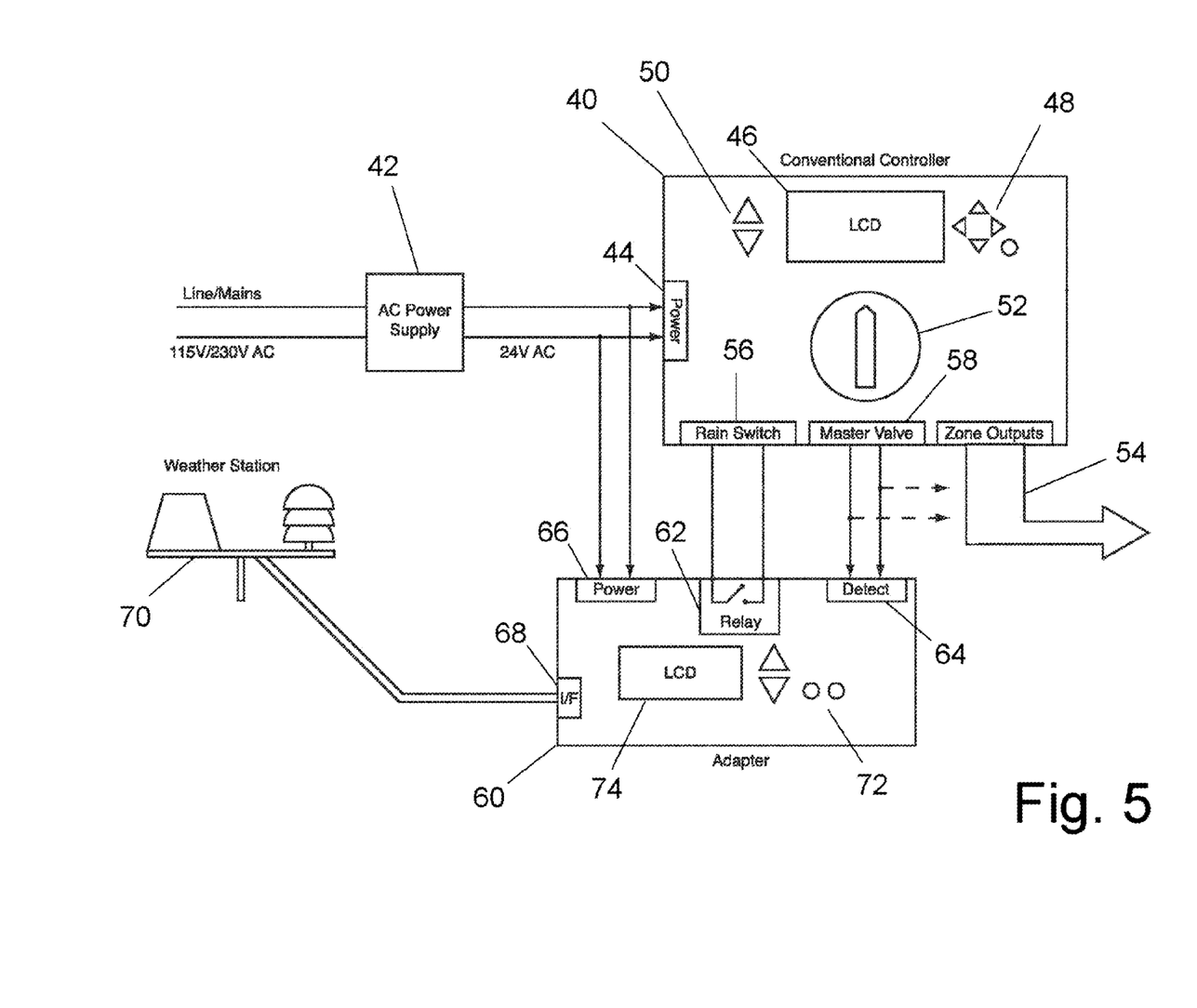
FIG. 5 is a connection diagram for a conventional controller and an adapter.

FIG. 5 shows an example of a connection diagram of an adapter for a first embodiment connected to a conventional controller. The adapter acts to constrain the controller to water proportionally to need according to the prevailing accumulated Evapotranspiration and rainfall.

A conventional irrigation controller 40 consists of an electronic circuit powered by an AC power supply 42 feeding usually 24V AC to the input 44 of the controller. The controller 40 has in it a display 46, usually an LCD, pushbutton switches 48, 50 and a rotary dial switch 52. Using the buttons, LCD and dial switch the user can enter data for conventional watering schedules. When watering, the controller activates each zone sequentially for a pre-programmed fixed time by passing the 24V AC out through a pair of wires 54 to the solenoid controlled watering valve (not shown). The plurality of zones so watered is called a watering cycle or watering program. Each program can be given a start time or multiple start times and which days to water.

The controller 40 usually has a pair of terminals for connecting a switch 56. This is designed for a switch that opens in the presence of more than a certain amount of rainfall and is generally called a rain switch input 56. In the presence of more than the threshold of rain, the rain measuring device connected to 56 opens its switch and irrigation ceases. Through this switch input 56, the adaptor 60 may be used to allow or inhibit watering cycles.

Most controllers have an additional 24V AC outlet 58 to a master valve (not shown). The controller 40 can be configured to energize output to the master valve at the beginning of a watering program and de-energize it at the end. The purpose of this output is typically to start an irrigation pump, or to open a common valve that supplies the network of irrigation water pipes to the individual zone solenoid valves.

The adapter 60 is wired so that its control relay 62 is connected to the rain switch 56 input of the controller 40. It is further wired to tap into the outlet 58 of the master valve of the controller 40 by connecting to the 24V AC detector 64 of the adapter 60. The adapter 60 may advantageously steal a small amount of power to the power input 66 for itself from the controller's power supply 42. However it may also be furnished with power from another source (not shown).

The adapter 60 needs to find out the cumulative Evapotranspiration over a period and the cumulative rainfall over the same period. Thus the adapter 60 can advantageously have a variety of interfaces 68 to collect such data. One such interface is the direct connection by cable or dedicated radio link to a nearby weather station 70. Another is a radio receiver to a dedicated ET broadcast (not shown). A third is a connection to the Internet to obtain ET and rainfall data (not shown). A further method is a manual entry of ET data through the adapter's keyboard 72. However it is accepted that there may be other methods to collect such data.

Using the adapter's display 74 and keys 72, the installer enters an amount for the Irrigation gain from an instance of the controller's watering program ("Irrigation" from Water Balance equation). The operator also enters an upper and lower threshold for permitted final Water Balance. From then on, the adapter 60 will allow or disallow watering program starts using the rain switch inhibit, depending on the final Water Balance it deduces from the sum of previous allowed irrigation watering programs, the estimate of ET and measured rainfall from the weather station added to the starting Water Balance. This balance will cycle hysteresically between the upper and lower limits that have been programmed into the adapter 60.

Figure 6:
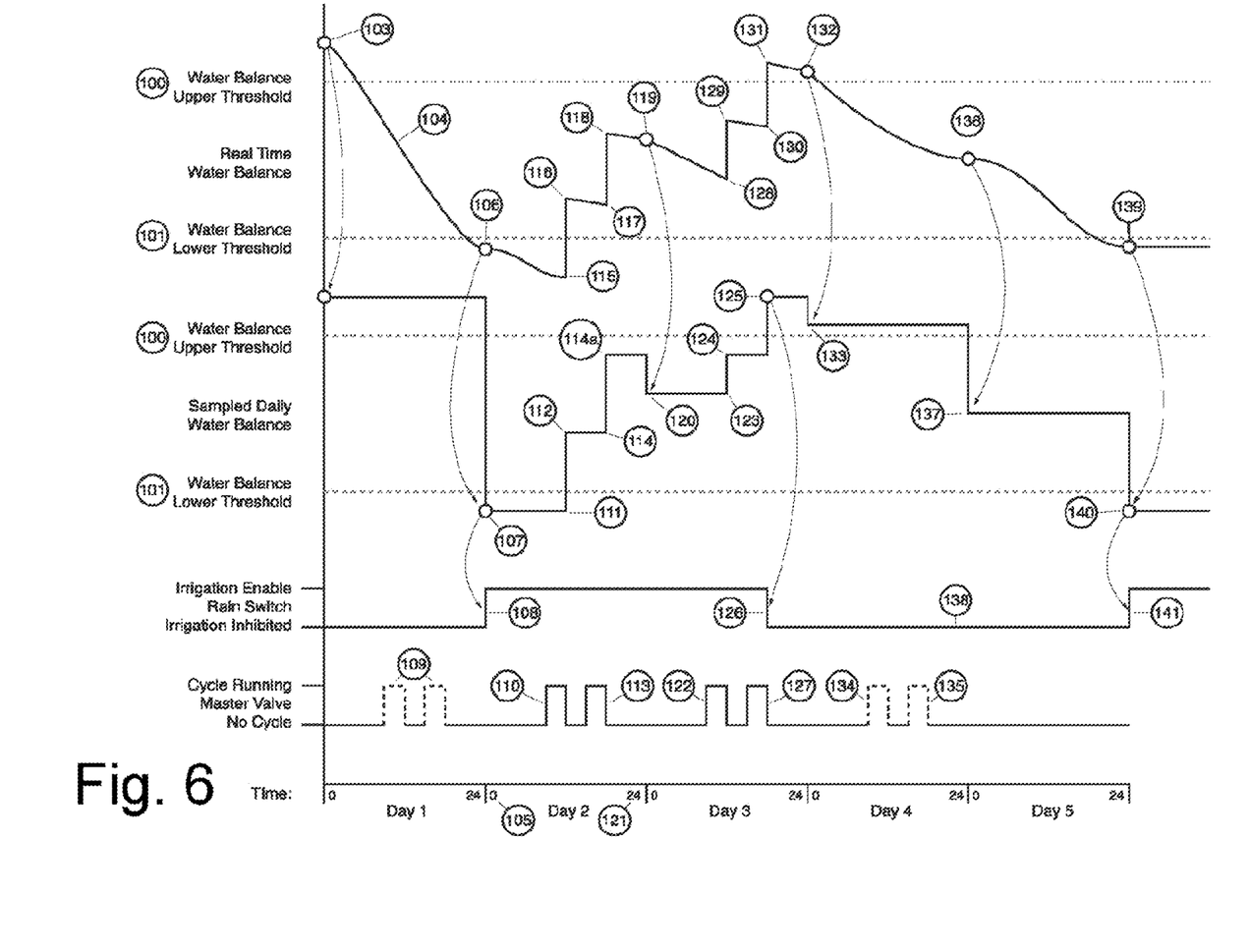
FIG. 6 is a timing and event diagram for watering cycles.

Reference is now made to FIG. 6 which is a timing and event diagram of an example of operation of a first embodiment of the adapter 60 in constraining a conventional controller 40 to water proportionally to the needs of plants according the prevailing accumulated Evapotranspiration and rainfall.

In this description of an example of operation as cited in FIG. 6, a weather station reading of the cumulative Evapotranspiration for the previous 24 hours is made available at midnight. This necessitates sampling of this value by the adapter 60 and the example algorithm implements the subsequent replenishment of lost water for the previous day. However it is recognized that there are other methods of reporting Evapotranspiration in real time. Therefore in the example that follows, there are two curves, one for real time Evapotranspiration and a curve for the sampled Evapotranspiration made available at midnight. The description of operation citing this latter example follows below.

Held within the software in the adapter is an upper threshold of Water Balance 100. Water Balance is the algebraic sum of the aggregate of the amount previously irrigated plus the rainfall received, less the cumulative Evapotranspiration loss. If the Water Balance is over this threshold 100, further irrigation will be inhibited. Likewise there is held a lower threshold of Water Balance 101 below which irrigation will be enabled. The curve labeled Real Time Water Balance, which starts at points 103, 104, 106, diagrammatically illustrate the daily movements of Water Balance due to Evapotranspiration, recorded rainfall and irrigation. The abscissa of FIG. 6 represents successive days with the value "24 0" 105, for example, representing midnight of that day.

Also held in the software in the adapter 60 is a value for the increase in Water Balance corresponding to an irrigation cycle having taken place.

At midnight, the cumulative Evapotranspiration for the last 24 hours is received from the Weather Station. The various methods by which this may be obtained are detailed below. The Evapotranspiration figure, so obtained, is then algebraically summed with the aggregate of rainfall recorded and irrigation delivered over the last 24 hours, to arrive at a starting Water Balance for the following day. This value is diagrammatically represented on the curve labeled Sampled Daily Water Balance. A small circle shows the actual value on the Real Time curve and an arrow points to the corresponding value on the Sampled curve.

During Day 1, the Water Balance may be seen to fall 104 due to Evapotranspiration, starting from a value 103 above the threshold 100, shown diagrammatically on the curve labeled Real Time Water Balance. During the course of Day 1 the Water Balance falls below the lower threshold 101. At midnight of Day 1 105, the previous day's 24 hour Evapotranspiration is obtained from the weather station 70 and the Water Balance computed. This value 106 is then recorded within the adapter 60, shown diagrammatically as point 107 on the curve labeled Sampled Daily Water Balance. As this point 107 is below the threshold 101, irrigation is enabled. This is achieved by placing the rain switch relay 62 to the controller in the enable position 108.

Thereafter on Day 2, the Water Balance continues to fall under the influence of Evapotranspiration. During this day, the irrigation controller, has been pre-programmed to run two equal watering cycles 110, 113, which are allowed to run because the rain switch relay 62 has been set to the enabled position. A watering cycle commences at the each of the controller's pre-programmed start times and is signaled by the master valve output 58 of the controller 40 becoming active 110, 113. At the end of each of the controller cycles, the master valve output 58 becomes inactive. At this point the adapter 60 adds a pre-set increase to the Water Balance bringing it from 111 to 112 on the Sampled curve then again from 114 to 114a after the second cycle. These increases are also equally represented on the Real Time curve in changes from 115 to 116 and 117 to 118. The amount of this preset increase had been manually entered into the adapter 60 by the user when the adapter was installed.

Thereafter on Day 3, the Water Balance continues to fall under the influence of Evapotranspiration. During this day, the irrigation controller 40 has been pre-programmed to run two equal watering cycles 122, 127, which are allowed to run because the rain switch relay 62 has been set to the enabling position. A watering cycle commences at each of the controller pre-programmed start times and is signaled by the controller's master valve output 58 becoming active 122, 127. At the end of each of the controller cycles, the master valve output 58 becomes inactive. At this point the adapter 60 adds a pre-set increase to the Water Balance bringing it from 123 to 124 on the Sampled curve then again from 124 to 125 after the second cycle. These increases are also equally represented on the Real Time curve in changes from 128 to 129 and 130 to 131. The amount of this preset increase had been manually entered into the adapter 60 by the user when the adapter 60 was installed. In this instance of the example, the second irrigation cycle 127 brings the increase in Water Balance to 125, which is greater than the upper Water Balance Threshold 100, so the adapter 60 puts the rain switch relay 62 to disable watering 126.

At midnight on Day 3, the Evapotranspiration for the previous 24 hours is obtained from the weather station 70. In the figure, this will be the aggregate of the curve from 119 to 128 plus 129 to 130, plus 131 to 132. Computing the Water Balance will give a net figure as at 132. This value is then sampled to record the point 133 in the Sampled curve. As this figure is still above the Water Balance upper threshold 100, the rain switch relay 62 is left in the disable watering position, inhibiting watering for the next day, being Day 4 in FIG. 6.

On Day 4, a similar watering schedule had been programmed into the controller, but because the adapter has deactivated the rain switch input 126, the cycles 134, 135 are not allowed to run. Meanwhile the Water Balance continues to fall under the influence of Evapotranspiration, falling towards the lower threshold 101 during Day 4. At midnight on Day 4 136, the 24 hour Evapotranspiration is again obtained, the Water Balance is again computed 136, and recorded 137, but as it is above the lower threshold 101 the rain switch input remains in its disabled position 138.

During Day 5 in this example, there are no watering cycles programmed. This is typical of many geographical areas, where watering is only permitted on certain days of the week. The Evapotranspiration loss continues to accumulate and is further updated at 139 and re-sampled at 140. Because the value at 140 is less than the lower Water Balance threshold 101, the adapter places the rain switch relay 62 in the enable position 141 to allow irrigation to recommence.

To summarize the above example of operation in FIG. 6, the adapter will allow the final Water Balance to oscillate hysteresically between the upper 100 and lower threshold 101.

The degree of overshoot and undershoot of the thresholds 100 and 101 will be influenced by the amount of water put on by each watering cycle and the potential frequency of such cycles. It would be advantageous to divide the controller's watering schedules into a plurality of small cycles running as frequently as the controller may allow. In this case the over and undershoot will be minimized by enabling only a proportion of the daily plurality of irrigation starts, giving finer control of the irrigation applied. However it is recognized that overly short zone watering times are inefficient due to supply pipes siphoning out through low lying watering heads after electric solenoid valve closure, so practically, a zone run time of no less than three minutes should be the shortest allowed.

The accurate pre-entry into the adapter 60 of the increase in Water Balance as the result of the operation of an irrigation cycle is also advantageous. This can be estimated by multiplying the run time of the chosen reference zone in the controller 40, by the actual field precipitation rate of the water emitters for that zone. A good zone to choose, if it exists, would be one which waters Cool Season Turfgrass in a full Sun location, or in any case the zone that requires the most amount of water on the site to be irrigated.

All irrigation cycles are preferably the same so that a constant value of Water Balance increase may be used.

In the example illustrated in FIG. 6, the effect of rainfall has not been shown. As rainfall is measured, the adapter will add this to the Water Balance equation to arrive at a final Water Balance figure. This net figure will be compared against the upper threshold 100 in deciding whether to enable or disable subsequent irrigation cycles.

Figure 7:
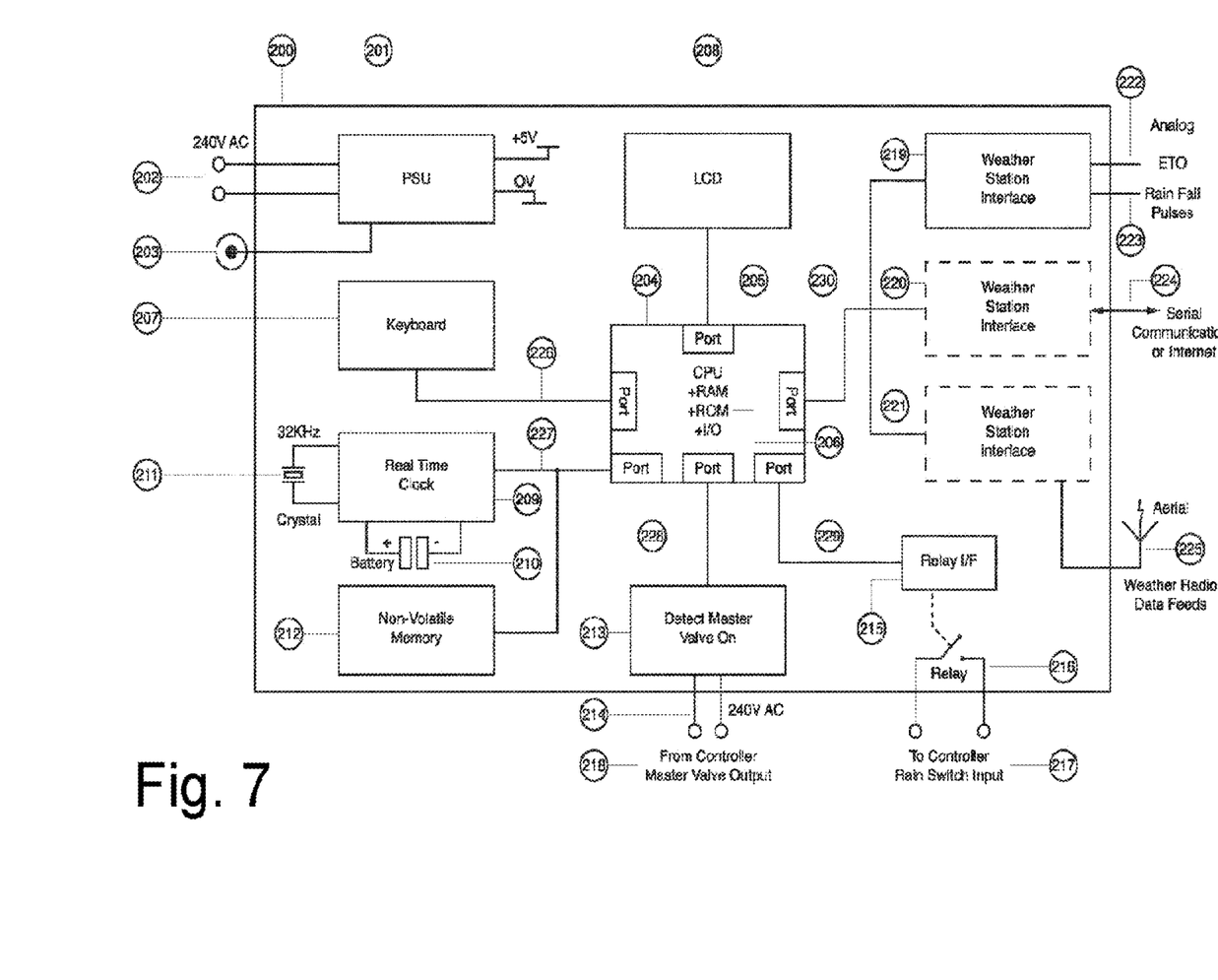
FIG. 7 is a block diagram of an adapter.

Reference is now made to FIG. 7 where a block diagram is shown of an example of how a first embodiment of the adapter 60 may be constructed.

The adapter 60 consists of a microprocessor 204 conventionally partitioned into a Central Processing Unit (CPU), Random Access Memory (RAM) 205, Read Only Memory (ROM) 206 and Input/Output (I/O) circuits. A user interface is provided comprising a display 208 which may be an LCD and a keyboard 207. By these means with the appropriate software executed by the CPU, the user may enter the parameters referred previously, obtain the status of the adapter 60 and read out historical statistical data.

To allow the adapter 60 to detect midnight and optionally to help process ET data, there is a Real Time Clock (RTC) 209 which is battery-backed 210 and uses a high accuracy timing crystal 211.

In order to store parameters and to record historical statistical data there is a non-volatile read/write memory 212. Both the RTC 209 and Memory 212 are interfaced to the CPU through 227, which may advantageously be a serial connected such as IIC or SPI.

The electronic assembly may be powered by stealing a small amount of power from the same source as supplies the controller, which is typically 24V AC 202. A Power Supply Unit (PSU) 201 converts the 24A AC to a useful DC voltage, typically 5V. It is recognized that tapping into the controller's source of supply is not strictly necessary, so it is advantageous to provide an alternative 203, such as may be obtained from a 6V DC wall PSU or the like.

A means must be provided to monitor the master valve output 218 of the controller using a suitable AC to logic level converter 213. Interfaced to the microprocessor via connection 228, it crucially allows the adapter 60 to sense when a watering cycle has just been completed. It is recognized that other outputs from a controller may be monitored rather than the master valve. In the case of a decoder-based controller, the two or three wire path to the decoders may be substituted. In the case of a multi-wire controller, one of the zone wires and the common may be monitored to similar effect.

In order to inhibit or allow watering by the controller 40 a relay is provided 216 driven by an interface circuit 215, connected to the CPU via path 229. Typically this relay is connected into the rain switch input to the controller 40; however it may be alternatively inserted in series with the zone common wire to disconnect all the solenoid operated water valves, when watering needs to inhibited.

It is recognized that many forms of weather monitoring apparatus exist, with a variety of electronic interfaces available. In FIG. 7, three such are shown by way of example, but this is not exhaustive. In all cases the adapter 60 needs to be able to find out the cumulative Evapotranspiration and rainfall. In example 219 the Evapotranspiration may be an analog signal 222 or a train of pulses, such as from an Evaporation gauge which produces a pulse in real time typically every 0.25 mm/0.01 inch of Evapotranspiration loss. Wet and/or dry ambient temperatures may also be used as the raw inputs to computing Evapotranspiration. Rainfall 223 in this example may be from a tipping bucket rain gauge which typically produces a pulse every 0.25 mm/0.01 inch of rainfall. Such apparatus is normally mounted near to the adapter 60, which is an advantage should there be a micro-climate in the irrigated area.

Increasingly there is now access to weather station data through the Internet, and this is illustrated in optional interface 220 with interface to the Internet through 224. As a variation on this, a dedicated weather station may be made available that can be interfaced through a standard serial link like RS232 or RS485.

A third example illustrated is an interface involving a radio receiver 221, tuned to a frequency providing incremental Evapotranspiration data. Such commercially available ready-built interfaces provide a simple pulse typically every 0.01 inch of Evapotranspiration in response to a broadcast signal received through aerial 225.

Thus an improved rain gauge and irrigation system has been disclosed. Although preferred embodiments of the method and apparatus have been shown and described, it will be understood that the invention is not limited to the embodiments disclosed, but is capable of numerous rearrangements, modifications and substitutions without departing from the spirit of the invention as set forth and defined by the following claims.

What is claimed is:

1. A rain gauge comprising
a collecting vessel including an open top, an upwardly concave bottom and a peripheral sidewall there between;
an orifice draining from the upwardly concave bottom, the orifice being of a diameter generating water drops of uniform mass through the orifice with water in the collecting vessel;
a sensor below the orifice capable of sensing individual water drops;
a hydrophilic filter, the collecting vessel including a filter cavity directly above and at the orifice, the filter filling the filter cavity and extending upwardly from the filter cavity.

2. The rain gauge of claim 1, the collecting vessel further including a deflector with an upwardly facing inclined surface and an outer periphery, the outer periphery being between and displaced from both the open top and the upwardly concave bottom and including at least one passage through the deflector at the peripheral sidewall.

3. The rain gauge of claim 2, the passage or passages being substantially fully about the outer periphery of the deflector.

4. The rain gauge of claim 2, the inclined surface being upwardly convex.

5. The rain gauge of claim 2, the passage or passages directing all water passing there through to flow along the inner periphery of the peripheral sidewall toward the upwardly concave bottom.

6. The rain gauge of claim 1, the orifice being an elongate tube of constant orifice size.

7. The rain gauge of claim 6, the tube being 6.25 mm in length and having an orifice size of 0.6 mm.

8. An adapter for an irrigation controller having a master valve output and a rain switch input, comprising
the rain gauge of claim 1;
a rain gauge input indicative of rainfall amounts coupled with the rain gauge;
a weather station input receiving Evapotranspiration data (ET);
an input from the master valve output receiving irrigation program cycles;
a routine for updating the current water balance value by reducing the sum of the rainfall and the irrigation cycles by the value of ET;
an output to the rain switch input responsive to the determination of the current water balance value.

9. The adapter for the irrigation controller of claim 8, the output to the rain switch input responsive to the determination of the current water balance value activates the rain switch input when a maximum water balance value is reached and deactivates the rain switch input when a minimum water balance value is reached.

10. A system for adapting an irrigation controller having a master valve output and a rain switch input to meet current watering needs, comprising
maintaining a current water balance value indicative of the current watering needs including receiving Evapotranspiration data (ET) from a weather station, irrigation program cycle data from the master valve output and rainfall data from a rain gauge and updating the current water balance value by reducing the sum of the rainfall and the irrigation by the value of ET;
maintaining a maximum water balance value and a minimum water balance value and comparing the maximum water balance value and the minimum water balance value with the current water balance value;
activating the rain switch input when the maximum water balance value is reached;
deactivating the rain switch input when the minimum water balance value is reached.

\* \* \* \* \*